Sept. 7, 1937.                C. C. FARMER                2,092,245
                            EMPTY AND LOAD BRAKE
                            Filed Feb. 23, 1935              6 Sheets-Sheet 1
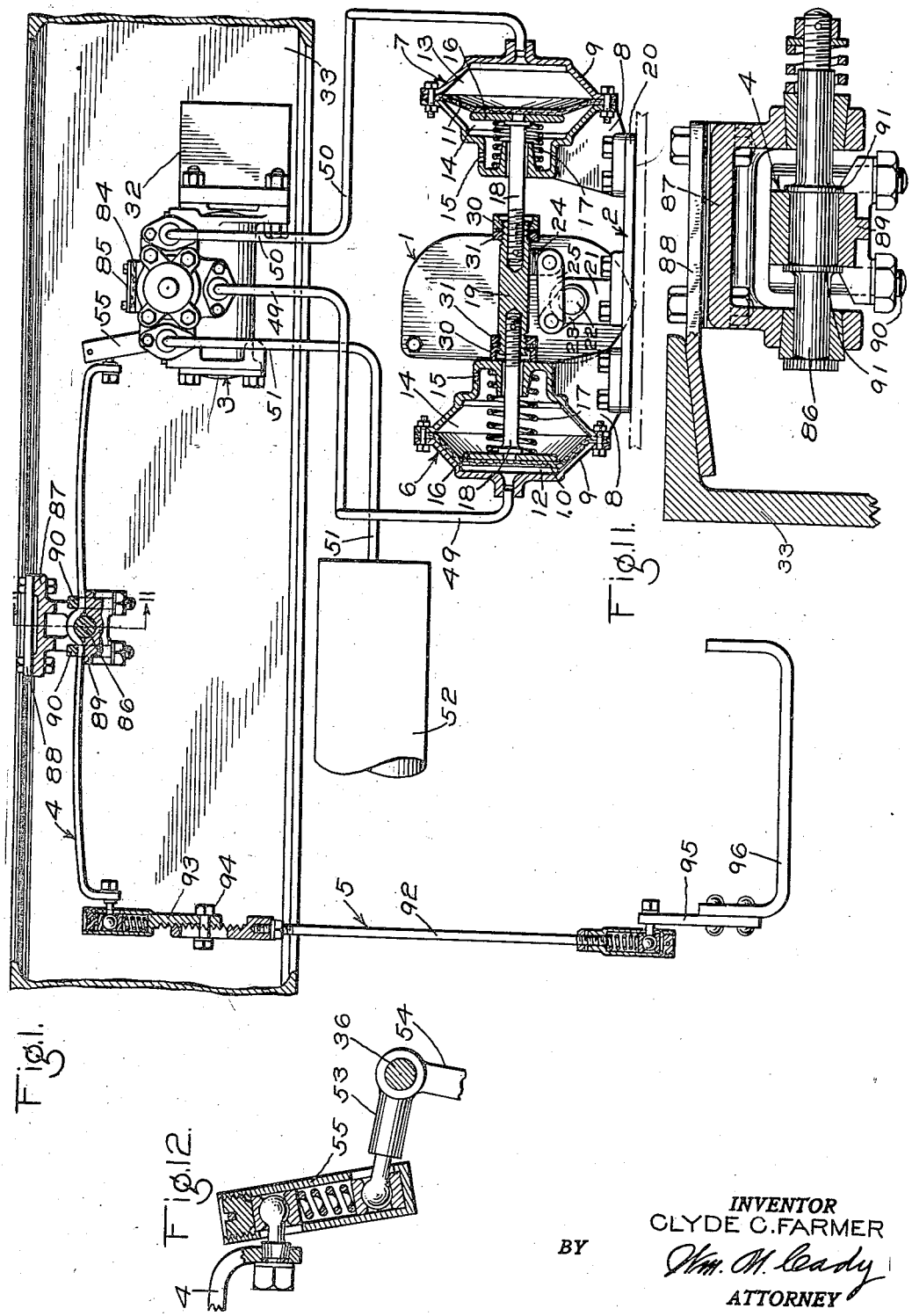
INVENTOR
CLYDE C. FARMER
BY
Wm. M. Cady
ATTORNEY Sept. 7, 1937.  C. C. FARMER  2,092,245
EMPTY AND LOAD BRAKE
Filed Feb. 23, 1935  6 Sheets-Sheet 2
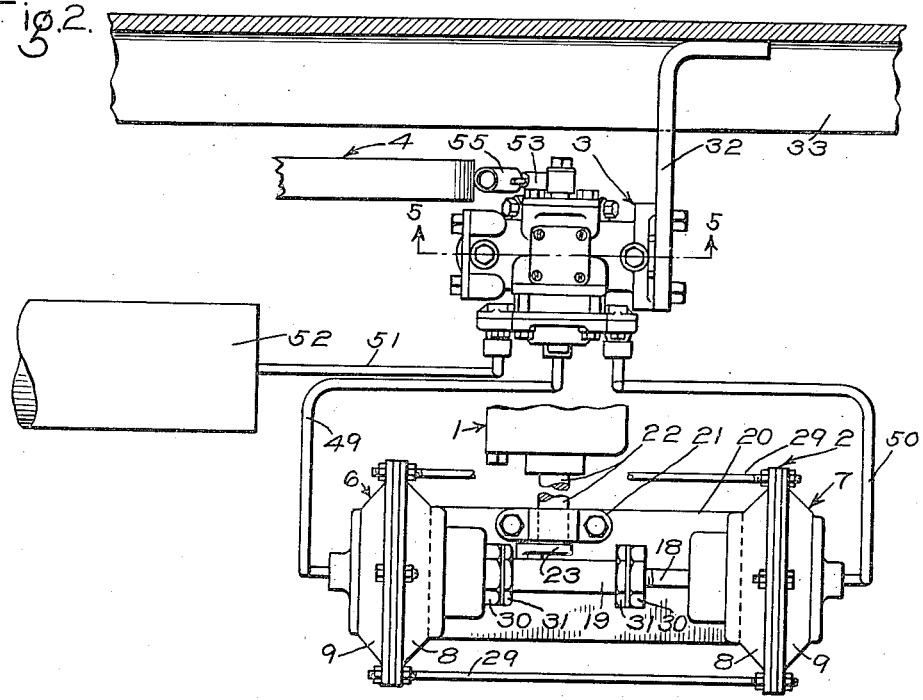
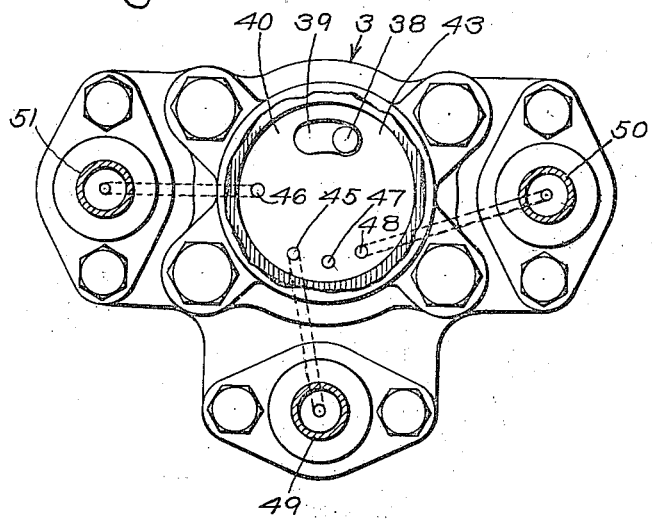
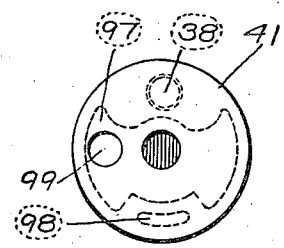
INVENTOR
CLYDE C. FARMER
BY Wm. M. Cady
ATTORNEY Sept. 7, 1937.  C. C. FARMER  2,092,245
EMPTY AND LOAD BRAKE
Filed Feb. 23, 1935   6 Sheets-Sheet 3
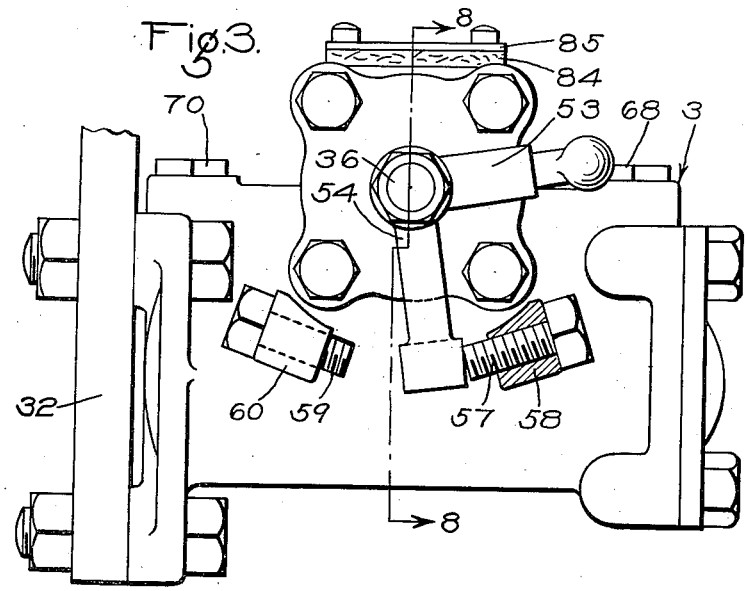
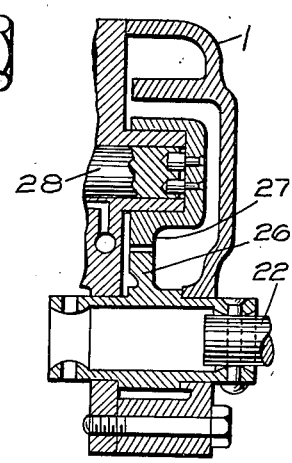
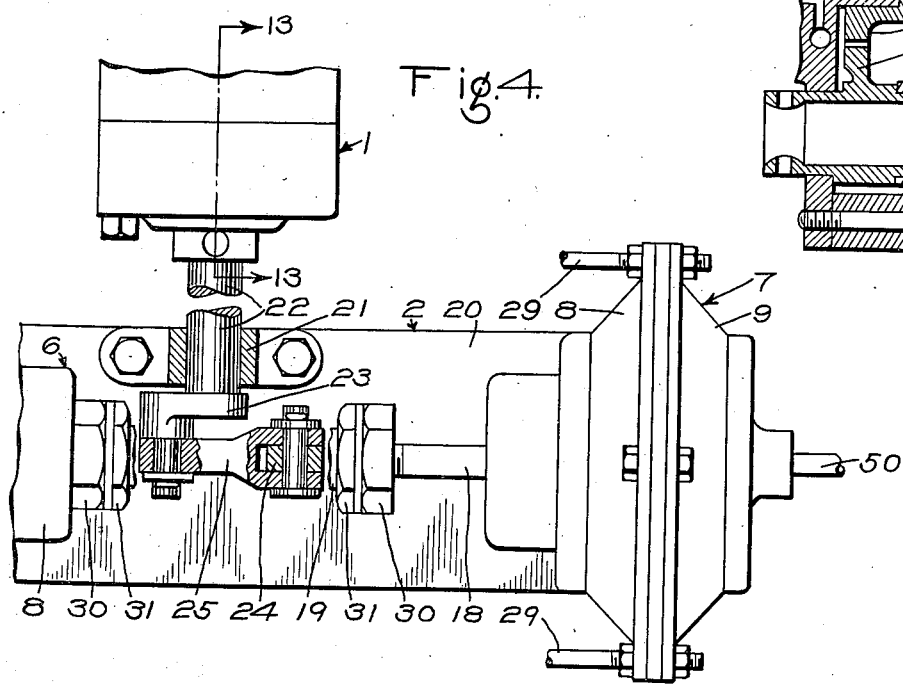
INVENTOR
CLYDE C. FARMER
BY Wm. M. Cady
ATTORNEY Sept. 7, 1937.  C. C. FARMER  2,092,245
EMPTY AND LOAD BRAKE
Filed Feb. 23, 1935  6 Sheets-Sheet 4

INVENTOR
CLYDE C. FARMER
BY Wm. M. Cady
ATTORNEY

Sept. 7, 1937. C. C. FARMER 2,092,245
EMPTY AND LOAD BRAKE
Filed Feb. 23, 1935 6 Sheets-Sheet 5

INVENTOR
CLYDE C. FARMER
BY Wm. M. Cady
ATTORNEY

Sept. 7, 1937.　　　　C. C. FARMER　　　　2,092,245
EMPTY AND LOAD BRAKE
Filed Feb. 23, 1935　　　　6 Sheets-Sheet 6
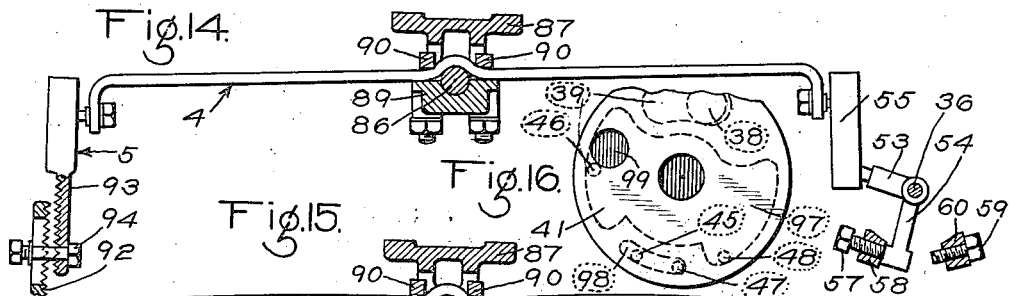
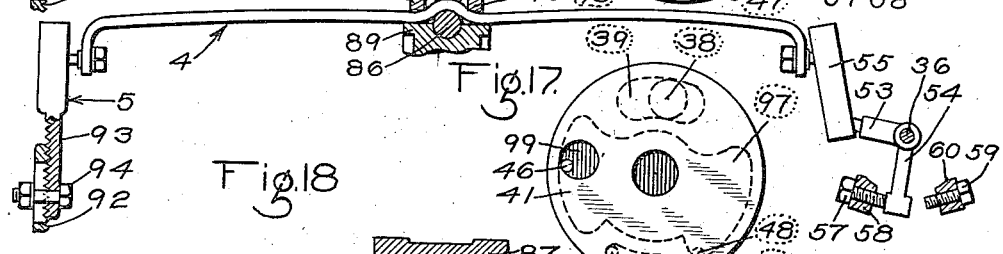
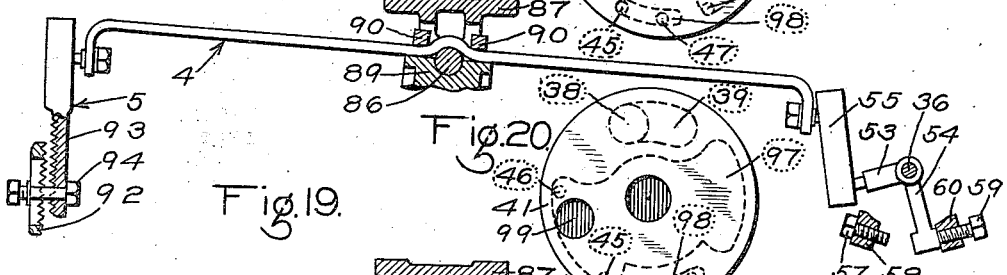
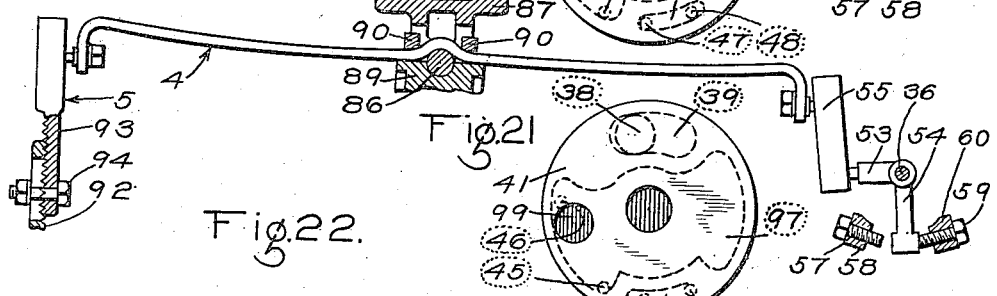
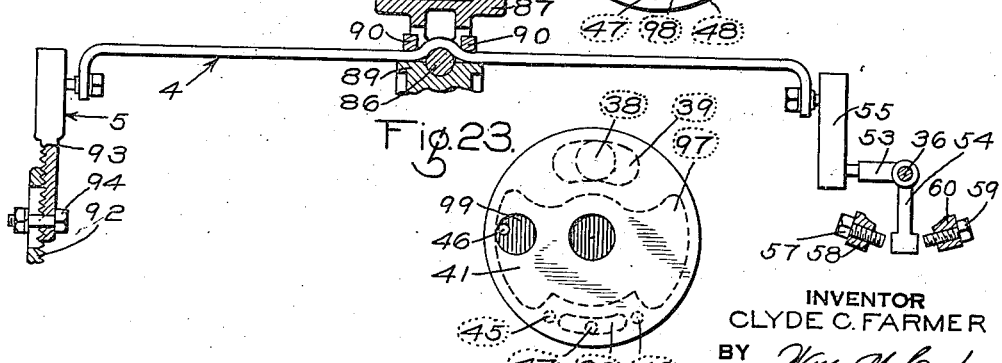
INVENTOR
CLYDE C. FARMER
BY Wm. M. Cady
ATTORNEY Patented Sept. 7, 1937

2,092,245

UNITED STATES PATENT OFFICE 2,092,245

EMPTY AND LOAD BRAKE

Clyde C. Farmer, Pittsburgh, Pa., assignor to The Westinghouse Air Brake Company, Wilmerding, Pa., a corporation of Pennsylvania Application February 23, 1935, Serial No. 7,748

40 Claims. (Cl. 303—22)

This invention relates to empty and load brake apparatus for vehicles and more particularly to the means for conditioning the brake apparatus for either empty or load service.

The principal object of the invention is to provide improved mechanism operative according to certain variations vertically in the distance between a fixed part of the vehicle body and a fixed part of at least one of the vehicle trucks for controlling the operation of a change-over valve device or mechanism adapted to condition a brake apparatus for empty and load braking, and which will not respond to relative temporary vertical vacillations or vibrations between the vehicle body and truck which may result from varying rail or wheel conditions or both.

Another feature of the invention resides in the means provided whereby the improved mechanism may be readily adjusted with the vehicle either empty or loaded and whereby with simple instructions an ordinary trainman may make the adjustments.

Other objects and advantages will appear in the following more detailed description of the invention.

Figure 5:
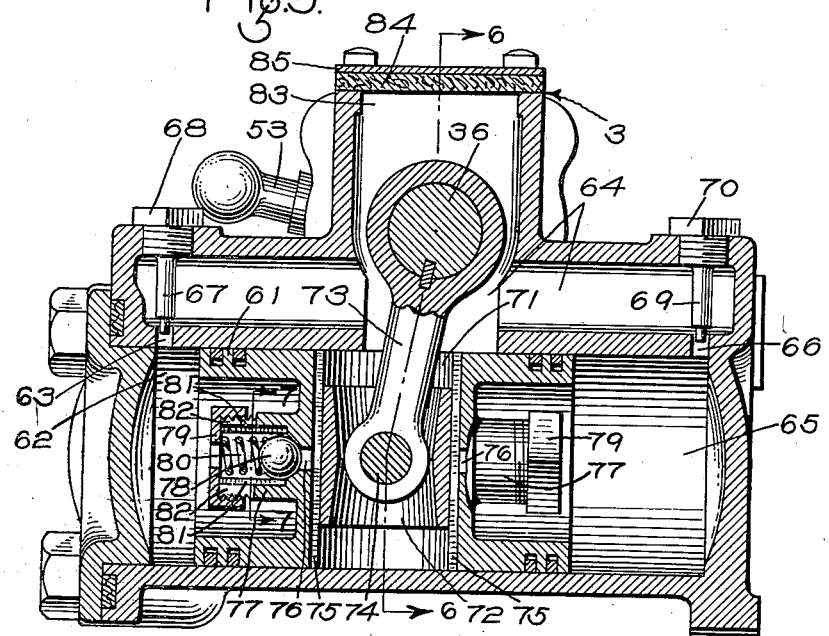
Figure 6:
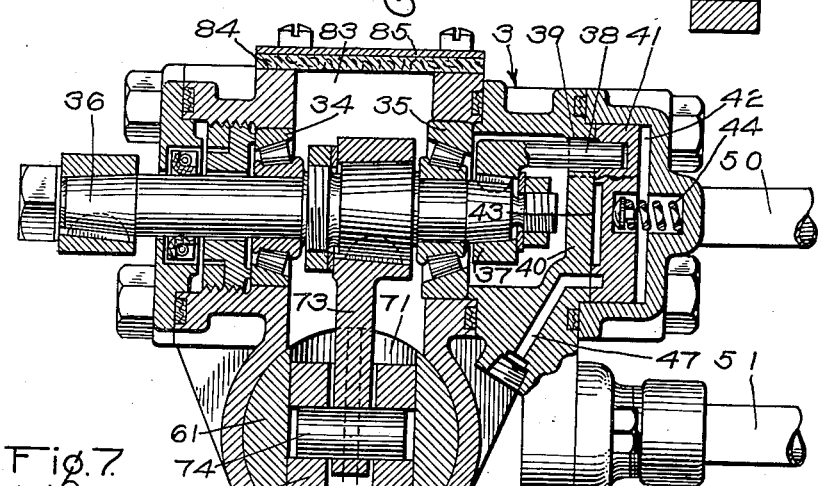
Figure 7:
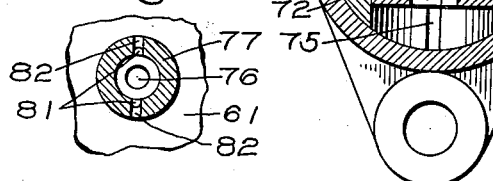
Figure 24:
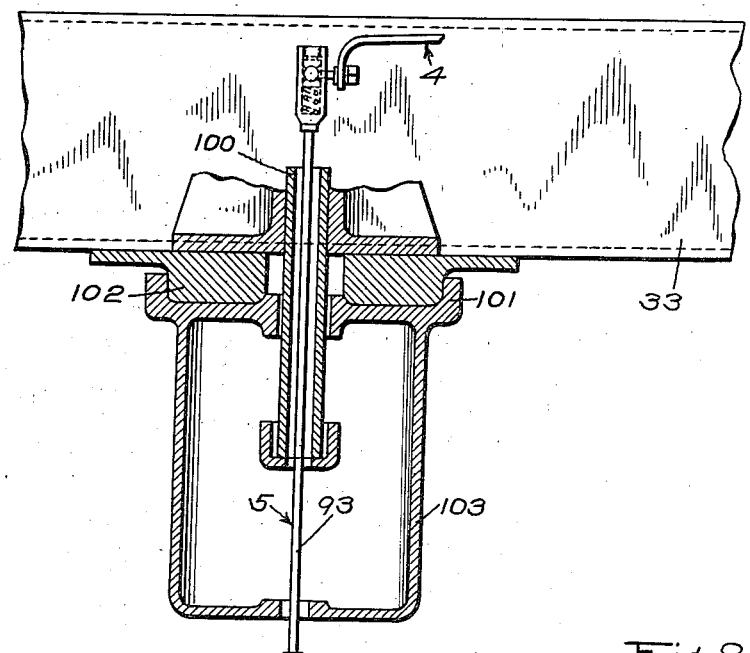
Figure 8:
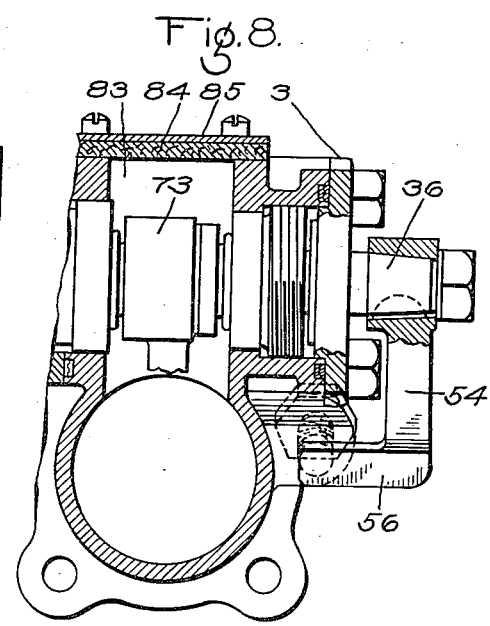

In the accompanying drawings, Fig. 1 is a diagrammatic side elevational view, partly in section, of the apparatus embodying the invention; Fig. 2 is a plan view of a large portion of the apparatus; Fig. 3 is an enlarged side elevational view of a control device of the apparatus; Fig. 4 is an enlarged plan view, partly in section, of the change-over engine or motor; Fig. 5 is a longitudinal sectional view of the control device taken on the line 5—5 of Fig. 2; Fig. 6 is a cross sectional view of the same taken on the line 6—6 of Fig. 5; Fig. 7 is a fragmentary cross sectional view taken on the line 7—7 of Fig. 6; Fig. 8 is a fragmentary cross sectional view of the control device taken on the line 8—8 of Fig. 3, portions being broken away to more clearly illustrate other portions; Fig. 9 is an enlarged end elevational view of the control device, one end of the casing thereof being broken away to illustrate the seat for a rotary valve; Fig. 10 is a rear face view of the rotary valve of the control device; Fig. 11 is an enlarged cross sectional view of a portion of the mechanism taken on the line 11—11 of Fig. 1; Fig. 12 is an enlarged detail sectional view of one of the ball and socket connections of the mechanism; Fig. 13 is a fragmentary sectional view taken on the line 13—13 of Fig. 4 and illustrates the operative connection between the change-over engine and a change-over valve device of a fluid pressure brake equipment; Figs. 14 and 15 are side elevational views, partly in section, of a portion of the mechanism and illustrate the manner of initially adjusting the mechanism when the vehicle to which it is applied is empty; Figs. 16 and 17 are rear face views of the rotary valve of the change-over engine, Fig. 16 illustrating the valve in the position it assumes when the mechanism is in the condition in which it is shown in Fig. 14, and Fig. 17 illustrating the valve in the position it assumes when the mechanism is in its adjusted position as shown in Fig. 15; Figs. 18 and 19 are views similar to Figs. 14 and 15, respectively, but illustrating the manner of adjusting the mechanism while the vehicle is loaded; Figs. 20 and 21 are similar to Figs. 16 and 17, respectively, but illustrating the rotary valve in the positions it assumes in adjusting the mechanism with the vehicle loaded; Fig. 22 is a view illustrating the mechanism adjusted and in a neutral position, that is to say, in the position it assumes when the vehicle is carrying half a load; and Fig. 23 illustrates the rotary valve in the position it may assume when the mechanism is in the condition in which it is shown in Fig. 22. Fig. 24 is a longitudinal sectional view of a portion of a vehicle and illustrating a modification of the invention in which that portion of the mechanism which is connected to the spring plank of the truck passes through a central bore in the king pin which maintains the vehicle body and truck in their proper pivotal relationship with each other.

In the accompanying drawings, the empty and load change-over mechanism constituting the present invention is illustrated in connection with the change-over valve device 1 of a fluid pressure brake equipment, but it is to be understood that the mechanism may be employed to actuate any other desired change-over means.

As shown, the empty and load change-over mechanism may comprise a change-over engine 2, a control device 3 for controlling the operation of the engine 2, a resilient control member or lever 4 in the form of a leaf spring pivotally carried by the vehicle body and adapted to control the operation of the control valve device 3, and an adjustable connection 5 secured at one end to a fixed part of a truck of the vehicle and at the other end operatively connected to one end of the lever 4.

In the present embodiment of the invention, the change-over engine 2 comprises spaced fluid pressure responsive motors 6 and 7 which may be identical in construction. Each motor comprises casing sections 8 and 9 which are clamped together and also comprises a flexible diaphragm, which in the motor 6, is indicated by the reference character 10 and in the motor 7, by the reference character 11. At one side of the flexible diaphragm is a pressure chamber, which in the motor 6, is indicated by the reference character 12 and in the motor 7, by the reference character 13. At the other side of the diaphragm is a chamber 14 which is constantly connected with the atmosphere by way of a passage 15. Contained in the chamber 14 is a movable follower 16 which is in operative engagement with the flexible diaphragm and which is subject to the pressure of a spring 17 also contained in chamber 14. The follower 16 is provided with a stem 18 which extends through an opening in the casing section 8 and at its end has screw-threaded connection with a coupling bar 19. It will be noted that the coupling bar 19 and stems 18 form in effect a continuous longitudinally movable stem between the followers 16 which, as will hereinafter more fully appear, is adapted to be reciprocated by the action of the diaphragms 10 and 11.

The casing section 8 of each motor is carried by a base member 20 which is adapted to be secured to any suitable rigid part of the vehicle body. As shown in the drawings, the member 20 is in the form of a plate to which the casing sections 8 are secured, but it will be understood that the member may, if desired, be integral with these casing sections.

Disposed between the casing sections 8 and secured to the base member 20 is a bearing member 21 in which the operating rock shaft 22 of the change-over valve device 1 is journaled. The outer end of the shaft extends beyond the bearing member and has secured thereto an operating arm 23 which is located beneath the coupling bar 19 and which in the present embodiment of the invention is operatively connected with a downwardly depending lug 24 of the bar by a link 25. In the present embodiment of the invention the inner end of the shaft is secured to toothed segment 26 of the change-over valve device 1, the teeth of which mesh with the teeth of an operating segment 27 secured to a shaft 28 through the medium of which a change-over rotary valve (not shown) is adapted to be actuated.

Above the base member 20 the motors 6 and 7 are rigidly tied together by tie rods 29 or any other desired means.

Each end of the coupling bar 19 of the change-over engine is provided with a stop 30 which is adapted to engage one of the casing sections 8 so as to limit the travel of the bar and consequently the stems 18 and diaphragms 10 and 11. In the present embodiment of the invention each of these stops is in the form of a nut which has screw-threaded connection with the coupling bar and which is locked against accidental rotation by means of a lock nut 31 also having screw-threaded connection with the coupling bar.

The control device 3 comprises a casing which houses a rotary valve mechanism for controlling the operation of the change-over engine 2 and which also houses a stabilizing mechanism which is adapted to act as a dashpot to prevent unintentional operation of the rotary valve mechanism under certain service conditions hereinafter fully set forth. In the present embodiment of the invention the casing is shown secured to a bracket 32 which is secured to the vertical web of a center sill 33 of the vehicle body, but it is to be understood that it may be secured to any other rigid part of the vehicle body.

Rockably journaled in the casing of the control device 3 through the medium of roller bearings 34 and 35 mounted in the casing is a shaft 36 having secured to one end thereof, so as to rock therewith, a valve operating member 37 which, at one side of the shaft, is provided with a finger 38. The end portion of the finger 38 extends through an arcuate opening 39 in a wall 40 of the casing and beyond the wall has a driving connection with a rotary valve 41 contained in a chamber 42. The outer surface 43 of the wall 40 constitutes the seat for the rotary valve and the face of the rotary valve is maintained in close sliding engagement with said seat by the action of spring means 44 interposed between and engaging the back of the rotary valve and an inner surface of the casing which defines the end wall of the chamber 42.

Leading from the valve seat 43 are passages 45, 46, 47, and 48. The passage 45 is connected through a pipe 49 to the pressure chamber 12 of the motor 6 and the passage 48 is connected through a pipe 50 to the pressure chamber 13 of the motor 7. The passage 46 is a supply passage and is connected through a pipe 51 to a fluid pressure supply source which is shown as a reservoir 52 and which, in some fluid pressure brake equipments, may be the usual auxiliary reservoir and in others an emergency reservoir or any other normally charged reservoir. The passage 47 is an exhaust passage and is in constant open communication with the atmosphere.

Disposed exteriorly of the casing and secured to the outer end portion of the shaft 36 is a shaft operating member having an operating arm 53 and a combined adjusting and stop arm 54 which arms may be disposed at right angles to each other. The arm 53 is operatively connected to one end of the resilient lever 4 by means of a link 55, the connection between the arm and link and the connection between the lever and the link both being of the ball and socket type to provide for universal movement of the parts.

The arm 54 at its end is provided with an inwardly extending portion 56 which is clearly shown in Fig. 8 and which is adapted to be engaged, as will hereinafter more fully appear, either by an adjusting screw 57 having screw-threaded connection with a lug 58 integral with the casing and arranged at one side of the arm, or by a similar adjusting screw 59 having screw-threaded connection with a lug 60 also integral with the casing and arranged at the other side of the arm. The lugs 58 and 60 are spaced apart a sufficient distance that when the screws 57 and 59 are turned down to their proper adjusted position, as shown in Fig. 3, the arm 54 is movable between the ends of the screws.

Below the shaft 36 a double acting piston or plunger 61 is mounted in the casing to move at right angles to the axis of the shaft. At one side of the piston is a chamber 62 which is open through a port 63 to a chamber 64 and at the other side of the piston is a chamber 65 which is open through a port 66 to the chamber 64, the flow area of the port 63 being restricted by a pin 67 which is carried by a plug 68 having screw-threaded connection with the casing. The flow area of the port 66 is similarly restricted by a pin 69 which is carried by a plug 70 having screw-threaded connection with the casing.

The plunger 61, intermediate its ends, is provided with a transverse bore 71 and slidably engaging the plunger within the bore is an annular operating sleeve 72. Secured to the shaft 36 is an operating arm 73 which at its lower end is operatively connected to the sleeve 72 by means of a pin 74. The surface of the bore 71 is provided with grooves 75, as shown in Figs. 5 and 6, and each groove is in communication with a passage 76 leading to the adjacent face of the plunger.

Each face of the plunger 61 is provided with an annular outwardly extending sleeve 77 which contains a ball check valve 78 which is adapted, as will hereinafter more fully appear, to prevent the flow of liquid from the adjacent plunger chamber to the bore 71. Interposed between and engaging the ball check valve and a cap 79 having screw-threaded connection with the outer end of the sleeve 77 is a spring 80 which at all times acts to urge the ball check valve toward its seat.

Interiorly the sleeve 77 is provided with longitudinal grooves 81 which are open to the plunger chamber through notches 82, the grooves and notches being provided to permit free flow of liquid past the ball check valve which is such size that there will be very little clearance between it and that portion of the inner surface of the sleeve between the grooves 81, the clearance being kept to a minimum to prevent the valve from vibrating against the sleeve with such force as to cause undue wear of the sleeve.

The chambers 62, 64, and 65 and bore 71 in the plunger are filled with a suitable non-congealing liquid which is adapted to be supplied through an opening 83 in the casing which opening is adapted to be covered by a porous element 84 which may be secured to the casing by means of a cover plate 85 secured to the casing by means of bolts. This porous element constitutes a breather for the chamber 64 and cleanses any air which may be drawn into the chamber. This porous element may be made of thick felt or any other suitable porous material.

The resilient lever 4 comprises a single member which is securely attached intermediate its ends to a rock shaft 86 which is journaled in a bracket 87 secured to a supporting member 88 welded or otherwise attached to the center sill 33 or any other rigid part of the vehicle body. In the present embodiment of the invention the lever 4 passes over the shaft 86 and is bent to conform to the upper half thereof, and beneath the shaft is a clamping block 89 which engages the lower half of the shaft, the upper face of the clamping block on each side of the shaft being in supporting engagement with the lever 4. The lever 4 and clamping block 89 are securely clamped to each other and to the shaft 86 by means of U-bolts 90 which are arranged one on each side of the shaft. It will be noted from Fig. 1 of the drawings that since the central portion of the lever and the clamping block each partly surrounds the shaft the lever will be prevented from accidentally moving longitudinally relative to the shaft. The shaft is provided with spaced collars 91 which engage the sides of the lever and clamping block and thereby prevent the spring and block from moving in the direction of the length of the shaft.

The adjustable connection 5 comprises parts 92 and 93 having their adjacent ends overlapped and adjustably secured together by means of a bolt 94, the contacting faces of the parts being serrated to prevent relative longitudinal movement between the parts when they are clamped together. The lower end of the part 92 is connected through a ball and socket joint with a member 95 secured to the spring plank 96 or any other rigid part of the vehicle truck, and the upper end of the part 93 is connected through a similar ball and socket joint with the left hand end of the lever 4.

Having described the several parts of the apparatus in detail, the manner of initially adjusting the mechanism will now be described.

When the apparatus is to be adjusted on an empty vehicle, the adjusting screw 57 is slacked back until the end which is adapted to engage with the portion 56 of the arm 54 is back of or flush with the stop face of the lug 58 as shown in Fig. 14, the screw 59 being turned in to its innermost position as shown. The lever 4 is then rocked in a counterclockwise direction about its central pivot point causing the link 55 to operate the arm 53 and thereby the shaft 36 and arm 54 to be rocked in a clockwise direction. As the lever is thus moved the part 93 and bolt 94 of the connection 5 move downwardly relative to the part 92 and when the arm 54 of the shaft operating member contacts with the lug 58 the nut on the bolt 94 is turned so as to rigidly clamp the parts 92 and 93 together. It will here be noted that with the arm 54 in engagement with the lug 58 and the parts 92 and 93 clamped together as just described, the lever is not flexed. Further, with the arm 54 in this position, the rotary control valve 41 will have been rotated by the shaft 36 to the position in which it is shown in Fig. 16. In this position a cavity 97 in the rotary valve establishes communication from the supply passage 46 to the passage 48 which is connected through pipe 50 to the chamber 13 of the change-over motor 7 and a cavity 98 establishes communication from the passage 45 which is connected through pipe 49 to the chamber 12 of the change-over motor 6 to the exhaust passage 47.

After the parts have been positioned as just described the adjusting screw 57 is turned in to its innermost position as shown in Fig. 15 causing the arm 54, shaft 36 and arm 53 to be rocked in a counterclockwise direction. The arm 53, as it is thus moved, acts through the medium of the link 55 to pull the adjacent end of the lever downwardly. Since the other end of the lever is held by the connection 5 against upward movement and the intermediate portion of the lever is pivoted, the lever will be flexed as shown in Figs. 1 and 15 when the adjusting screw is turned to its innermost position. The rotation of the shaft 36 causes the rotary valve 41 to assume the position in which it is shown in Fig. 17. With the rotary valve in this position, the communications which were established with the rotary valve positioned as shown in Fig. 16 are maintained.

The shaft 36, as it is rocked when the apparatus is being adjusted, moves the arm 73 and thereby the plunger 61 first in a direction toward the left hand and then in a direction toward the right hand, and with the apparatus finally adjusted, the plunger is in the position in which it is shown in Fig. 5.

With the apparatus thus finally adjusted, fluid under pressure supplied to the reservoir 52 flows to the chamber 13 of the change-over motor 7 by way of pipe 51, passage 46, cavity 97 in the rotary valve 41, passage 48 and pipe 50. Since the chamber 12 of the change-over motor 6 is connected to the atmosphere through pipe 49, passage 45, cavity 98 in the rotary valve and passage 47, fluid under pressure in chamber 13 causes the diaphragm 11 to flex in a direction toward the left hand. The diaphragm as it is being thus flexed causes the stem 18 and coupling bar 19 to be shifted in the same direction, the bar acting through the medium of the lug 24, link 25 and arm 23 rotating the change-over shaft 22 in a counterclockwise direction until such time as the bar is brought to a stop by the engagement of the stop 30 with the casing section 8 of the change-over motor 6 as shown in Fig. 1.

In the present embodiment of the invention, the shaft 22 is shown associated with a change-over valve device 1 and, when rotated in the manner just described, causes the change-over valve device to function to condition the brake equipment for empty vehicle service.

When the vehicle is being loaded the vehicle body and consequently the lever supporting bracket 87 and central portion of the lever 4 will move downwardly relative to the connection 5 which is secured to the spring plank 96 of the truck.

When the vehicle is loaded to around one half of the full load, the downward movement of the vehicle body relative to the connection 5 is such that the lever 4 is permitted to straighten out, as shown in Fig. 22, causing the arms 53 and 54 and the shaft 36 of the control device 3 to move in a counterclockwise direction from the position in which they are shown in Figs. 1 and 15 to the position in which they are shown in Fig. 22, the rotary valve 41 being shifted, upon such movement of the shaft, to the position in which it is shown in Fig. 23.

The rotary valve in this position laps the passages 45 and 48, so that fluid under pressure in chamber 13 is bottled up and the fluid in chamber 12 remains at atmospheric pressure. Due to this the change-over engine will be maintained in empty position.

Now if the load on the vehicle is increased, the downward movement of the vehicle body relative to the connection 5 causes the lever to pivot downwardly about the ball and socket joint between the left hand end of the lever and the connection 5. As the right hand end of the lever is being thus moved, the link 55 which is operatively secured thereto causes the arms 53 and 54 and shaft 36 of the control device 3 to be moved in a counter-clockwise direction from the position in which they are shown in Fig. 22 toward the position in which they are shown in Fig. 19.

When the vehicle has been loaded to around sixty per cent of its full load, the lever 4 will have caused the arms 53 and 54 and shaft 36 to move to the position in which the arm 54 engages with and is brought to a stop by the adjusting screw 59. This movement of the shaft 36 causes the rotary valve 41 to be shifted to the position in which it is shown in Fig. 21. It will here be noted that at the time the arm 54 engages with the adjusting screw the lever 4 is not flexed, but will be flexed if the load on the vehicle is further increased as will hereinafter be more fully set forth.

With the rotary valve 41 thus positioned, the passage 45 is in communication with the supply cavity 97 in the valve and the passage 48 is in communication with the exhaust cavity 98 in the valve.

It will be seen from an inspection of Figs. 14 to 22, inclusive, that the cavity 97 in the rotary valve is in constant open communication with the supply passage 46 and that the exhaust cavity 98 is in constant open communication with the exhaust passage 47, so that with the rotary valve positioned as shown in Fig. 21, fluid under pressure is vented from the chamber 13 of the change-over motor 6 to the atmosphere by way of pipe 50, passage 48, cavity 98 and passage 47, and at the same time fluid under pressure is supplied to the chamber 12 of the change-over motor 6 by way of pipe 51, passage 46, cavity 97, passage 45 and pipe 49. It will also be noted that the rotary valve chamber 42 is constantly in communication through a port 99 with the cavity 97 so that with the reservoir 52 charged fluid under pressure supplied therefrom to the chamber 42 acts to urge the rotary valve against the rotary valve seat.

With the chamber 13 vented, fluid under pressure supplied to the chamber 12 causes the diaphragm 10 of the change-over motor 6 to flex in a direction toward the right hand, causing the followers 16, stems 18 and coupling bar 19 to be shifted in the same direction until such time as the parts are brought to a stop by the engagement of the stop 30, on the right hand end of the coupling bar, with the casing section 8 of the change-over motor 7.

As the change-over engine is thus actuated, the coupling bar 19 thereof, acting through the medium of the lug 24, link 25 and arm 23 causes the shaft 22 to rotate in a clockwise direction to operate the change-over valve device 1 to condition the brake apparatus for load braking.

When, with the arm 54 in engagement with the adjusting screw 59, the load on the vehicle is further increased, the downward movement of the vehicle body and central portion of the lever relative to the ends of the lever, which are maintained substantially stationary by the connection 5 and the link 55, causes the lever to be flexed in the opposite direction from which it is flexed when the vehicle is empty, Fig. 19 illustrating the flexed condition of the lever with the vehicle fully loaded.

Upon the removal of the load carried by the vehicle, the body will move upwardly relative to the truck to its original empty position and, as the body thus moves, the several parts of the apparatus will assume their initial empty position and the change-over valve device 1 will be caused to move to again condition the brake equipment for empty braking.

It will here be understood that with the vehicle either empty or substantially fully loaded, the lever 4 is flexed sufficiently to maintain the rotary valve 41 in either the empty or load position as the case may be when, due to varied track and wheel conditions, unavoidable vacillations or vibrations between the vehicle body and trucks occur, thus the flexed lever 4 acts to prevent the brake mechanism from being accidentally conditioned for load service when the vehicle is empty or for empty service when the vehicle is loaded.

Hereinbefore it has been pointed out that when the vehicle is carrying from one half to around sixty per cent of a full load the lever 4 is not flexed. Under these conditions the hereinbefore mentioned unavoidable vacillations or vibrations between the vehicle body and trucks tend to cause the lever 4 to act to move the rotary valve 41 from its proper adjusted position but such a tendency is counteracted by the action of the dashpot mechanism of the control device 3. In this connection it will be noted that when due to the above mentioned vacillations or vibrations, the distance between the fixed parts of the vehicle body and the fixed parts of the truck carrying a portion of the apparatus is decreased, the lever 4, acting through the medium of the link 55 and arm 53, tends to rotate the shaft 36 in a counterclockwise direction and when, due to these vacillations or vibrations, the distance between the fixed parts of the body and truck is increased, the lever, acting through the medium of said link and arm, tends to rotate the shaft in a clockwise direction.

Torque applied to the shaft 36 by the action of the lever 4 and tending to rotate the shaft in a counterclockwise direction exerts a force on the plunger 61 tending to move it in a direction toward the right hand through the medium of the arm 73 secured to the shaft. As the plunger starts to move in this direction it immediately starts to displace liquid from the chamber 65 through the restricted passage 66 at a slow rate, so that the liquid in chamber 66 resists movement of the plunger and thereby the shaft 36 and rotary valve 41 which is operatively connected with the shaft. The displaced liquid entering the chamber 64 displaces a corresponding amount of liquid through the passage 76 and past the ball check valve 78 carried by the left hand end of the plunger to the chamber 62. Liquid in chamber 64 is also free to flow through the restricted passage 63 to the chamber 62. The flow area of the groove 75 and passage 76 is great enough to permit the entry of fluid to the chamber 62 at as fast a rate as fluid is displaced from the chamber 65 so that there will be no tendency for the piston, when it is moved toward the right to create a partial vacuum in the chamber 62 which might act to cause the plunger to move too far to the left when the shaft is relieved of the torque which tends to rotate the shaft in the counterclockwise direction and has torque applied thereto tending to rotate the shaft in the opposite direction.

Torque applied to the shaft 36 by the action of the lever 4 and tending to rotate the shaft in a clockwise direction exerts a force on the plunger 61 tending to move it in a direction toward the left hand through the medium of the arm 73. Movement of the plunger in this direction is resisted by the liquid in chamber 62 in the same manner as the fluid in chamber 65 resists movement of the plunger toward the right.

It will be apparent from the foregoing description that the dashpot mechanism will due to its dampening effect prevent unavoidable vacillations or vibrations between the vehicle body and truck from causing the shaft 36 to rotate a sufficient distance to move the rotary valve 41 from its proper change-over position. When the vehicle is empty or substantially fully loaded, the levers are flexed so that under ordinary or normal vacillations or vibrations between the body and truck the shaft 36 is not rotated so that the dashpot mechanism just described will not operate; however, if the magnitude of the vacillations or vibrations should be such that the lever would have a tendency to move the shaft the dashpot mechanism will operate to resist such a tendency.

Hereinbefore it has been described how the apparatus is initially adjusted to an empty vehicle, and as it may be desired to initially adjust the apparatus on a loaded vehicle the manner of accomplishing this is as follows: The adjusting screw 59 carried by the lug 60 of the control device 3 is slacked back until the end thereof is at least flush with the stop face of the lug, after which the lever 4 is rocked about its pivot point in a counterclockwise direction causing the arm 53 and consequently the shaft 36 and arm 54 to be rotated in a clockwise direction. Now when, as shown in Fig. 18, the arm 54 engages the stop face of the lug and before the lever is flexed, the bolt 94 is tightened so as to clamp the parts 92 and 93 of the connection 5 securely together. The adjusting screw is now turned down as shown in Fig. 19 causing the arms 54 and 53 and shaft to move in a clockwise direction, the arm 53 acting through the medium of the link 55, to flex the lever as shown in this figure and the rotary valve 41 will be moved to the position in which it is shown in Fig. 21. Before the adjusting screw is turned down to flex the lever 4, the rotary valve is in the position in which it is shown in Fig. 20. With the rotary valve in either of these positions the change-over engine will be maintained in load position if the reservoir 52 is charged with fluid under pressure.

In Fig. 24 a modification of the connection 5 is illustrated in which the part 93 passes through a central bore in a king pin 100 which, together with the truck and body center plates 101 and 102, respectively, interlock the vehicle body and truck bolster 103 together. The lower end portion of the part 93 extends through an opening in bolster 103 and below the bolster is adjustably connected to the part 92 by means of the bolt 94. The lower end of the part 92 is connected to an inverted L-shaped bolt 104 which is secured to the web of the spring plank 96. When this type of connection is used the operation of the mechanism will be the same as when the connection shown in Fig. 1 is used.

The construction in which the connection or strut 5 for controlling the operation of the empty and load change-over apparatus passes through the center of the pivotal connection between the car body and car truck, all as shown in Fig. 24, is broadly covered in my copending application Serial No. 58,488, filed January 10, 1936, and therefore claims to this feature are not included in the present application.

From the foregoing description it will be apparent that when the vehicle body is either empty or fully loaded the mechanism which constitutes the present invention will not respond to temporary relative vertical movements between the vehicle body and truck caused by shocks due to varying rail or wheel conditions or to any other service conditions to cause the change-over apparatus to be accidentally actuated from either its empty position or its load position as the case may be, thus maintaining the brake system conditioned according to the load carried by the body. It will also be evident that the dashpot mechanism will also act to prevent the mechanism from responding to relative vertical movement between the body and truck due to service shocks, but will yield to a persistent slow vertical movement of the body relative to the truck as when the body is being loaded or unloaded, so that the rapid vibrations caused by service shocks will be prevented from causing the mechanism to function to accidentally actuate the change-over apparatus.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a mechanism for actuating the empty and load change-over apparatus of an empty and load brake system, in combination, a vehicle body and a truck therefor, a member operative to actuate said change-over apparatus, means operative to actuate said member, and resilient means comprising a flexible lever cooperating with a relatively fixed part of the truck and with the vehicle body and operative upon vertical movement of the body relative to the truck due to variations in the load carried by the body for actuating said means, said lever being flexed and thereby stressed to render it ineffective to actuate said means when relative vertical movement occurs between the vehicle body and truck due to conditions other than the variations in the load carried by the body.

2. In a mechanism for actuating the empty and load change-over apparatus of an empty and load brake system, in combination, a vehicle body and a truck therefor, a member operative to actuate said change-over apparatus, means operative to actuate said member, and resilient means comprising a flexible lever cooperating with a relatively fixed part of the truck and with the vehicle body and operative upon vertical movement of the body relative to the truck due to variations in the load carried by the body for actuating said means, said lever being flexed and thereby stressed when the vehicle body is either empty or loaded to render it ineffective to actuate said means when relative vertical movement occurs between the vehicle body and truck due to conditions other than the variations in the load carried by the body.

3. In a mechanism for actuating the empty and load change-over apparatus of an empty and load brake system, in combination, a vehicle body and a truck therefor, a member operative to actuate said change-over apparatus, means operative to actuate said member, and a resilient member carried by the vehicle body operatively anchored at one end to a relatively fixed part of the truck and operatively connected at the other end to said means and operative upon vertical movement of the vehicle body relative to the truck due to variations in the load carried by the body for actuating said means, said member being flexed at each side of the connection between the body and member when the vehicle body is empty and loaded to render it ineffective to actuate said means when relative vertical movement occurs between the vehicle body and truck due to service shocks.

4. In a mechanism for actuating the empty and load change-over apparatus of an empty and load brake system, in combination, a vehicle body and a truck therefor, a member operative to actuate said change-over apparatus, means operative to actuate said member, a resilient member pivotally attached at one end to a relatively fixed part of the truck, at its other end operatively connected with said means and intermediate its ends attached to the vehicle body, and operative upon vertical movement of the body relative to the truck when such movement is due to variations in the load carried by the body for actuating said means, said member being flexed in one direction when the vehicle body is empty for exerting a downwardly directed force on said means and being flexed in the opposite direction when the vehicle body is loaded for exerting an upwardly directed force on said means, and means for preventing the member when flexed from acting to actuate said means, the degree of flexure of said member being such as to render the member ineffective to actuate said means when due to service shocks there is relative vertical movement between the vehicle body and truck.

5. In a mechanism for actuating the empty and load change-over apparatus of an empty and load brake system, in combination, a vehicle body and a truck therefor, a member operative to actuate said change-over apparatus, means operative to actuate said member, a resilient member pivotally attached at one end to a relatively fixed part of the truck, at its other end operatively connected with said means and intermediate its ends attached to the vehicle body, and operative upon vertical movement of the body relative to the truck when such movement is due to variations in the load carried by the body for actuating said means, said member being flexed in one direction when the vehicle body is empty for exerting a downwardly directed force on said means and being flexed in the opposite direction when the vehicle body is loaded for exerting an upwardly directed force on said means, means for preventing the member when flexed from acting to actuate the first mentioned means, the degree of flexure of said member being such as to render the member ineffective to actuate the first mentioned means when due to service shocks there is relative movement between the vehicle body and truck, and means operative to prevent the member from actuating the first mentioned means when the member is flexed upon relative vertical movement between the body and truck due to service shocks.

6. In a mechanism for actuating the empty and load change-over apparatus of an empty and load brake system, in combination, a vehicle body and a truck therefor, a member operative to actuate said change-over apparatus, means operative to actuate said member, and resilient means cooperating with a relatively fixed part of the truck and operative upon vertical movement of the body relative to the truck due to variations in the load carried by the body for actuating said means, said resilient means being flexed when the vehicle body is either empty or loaded to render it ineffective to actuate said means when relative vertical movement occurs between the vehicle body and truck due to conditions other than variations in the load carried by the body and being unflexed when a light load is carried by the body, and means operative to prevent the first mentioned means from being actuated by the action of the unflexed resilient member under the influence of relative vertical movement between the vehicle body and truck caused by service shocks.

7. In a mechanism for actuating the empty and load change-over apparatus of an empty and load brake system, in combination, a vehicle body and a truck therefor, a member operative to actuate said change-over apparatus, means operative to actuate said member, and resilient means cooperating with a relatively fixed part of the truck and operative upon vertical movement of the body relative to the truck due to variations in the load carried by the body for actuating said means, said resilient means being flexed when the vehicle body is either empty or loaded to render it ineffective to actuate said means when relative vertical movement occurs between the vehicle body and truck due to conditions other than variations in the load carried by the body and being unflexed when a light load is carried by the body, and a dashpot mechanism adapted to function to prevent the first mentioned means from being actuated by the action of the unflexed resilient member under the influence of relative vertical movement between the vehicle body and truck caused by service shocks.

8. In a mechanism for actuating the empty and load change-over apparatus of an empty and load brake system, in combination, a vertical body and a truck therefor, a member operative to actuate said change-over apparatus, means having two temporary adjusting positions an empty position and a load position and operative to one or the other of the two latter change-over positions to actuate said member, a resilient member pivotally carried intermediate its ends by the vehicle body and rockable on its pivot relative to the truck for actuating said means to either one of its temporary adjusting positions, means for anchoring one end of the member to the truck when said means is in either one of its adjusting positions, means operative to move said means from its adjusting position to one of its change-over positions to flex said member, said member when anchored to the truck and flexed being responsive to vertical movement of the body relative to the truck when such movement is due to variations in the load carried by the body and being unresponsive to such movement caused by service shocks.

9. In a mechanism for actuating the empty and load change-over apparatus of an empty and load brake system, in combination, a vehicle body and a truck therefor, a member operative to actuate said change-over apparatus, means operative to actuate said member, resilient means comprising a resilient lever responsive to vertical movement of the vehicle body relative to the truck due to variations in the load carried by the body for actuating said means and unresponsive to such movement caused by conditions other than variations in the load carried when the vehicle is either empty or fully loaded, and means cooperating with said resilient lever for preventing said resilient means from actuating the first mentioned means when the vehicle body is carrying a partial load and vertical movement between the vehicle body and truck is caused by conditions other than variations in the load carried.

10. In a mechanism for actuating the empty and load change-over apparatus of an empty and load brake system, in combination, a vehicle body and a truck therefor, a member operative to actuate said change-over apparatus, means operative to actuate said member, resilient means comprising a resilient lever responsive to vertical movement of the vehicle body relative to the truck due to variations in the load carried by the body for actuating said means and unresponsive to such movement caused by conditions other than variations in the load carried when the vehicle is either empty or fully loaded, and resistance means operative to resist movement of the first mentioned means by the resilient means when, due to conditions other than variations in the load carried, vertical movement occurs between the vehicle body and truck.

11. In a mechanism for actuating the empty and load change-over apparatus of an empty and load brake system, in combination, a vehicle body and a truck therefor, a member operative to actuate said change-over apparatus, means operative to actuate said member, resilient means responsive to a certain degree of gradual vertical movement of the vehicle body relative to the truck due to variations in the load carried by the body for actuating said means and normally unresponsive to the same degree of sudden vertical movement such as caused by service shocks, and means for preventing the operation of the first mentioned means by the resilient means when due to vertical movement between the vehicle body and truck caused by service shocks the resilient means tends to actuate the first mentioned means.

12. In a mechanism for actuating the empty and load change-over apparatus of an empty and load brake system, in combination, a vehicle body and a truck therefor, a member operative to actuate the empty and load change-over apparatus, a mechanism for actuating said member, means operative to control the operation of said mechanism, and means comprising a normally stressed spring operatively secured to said body, truck and the control means responsive to certain intended vertical movements of the vehicle body relative to the truck for actuating the controlling means and unresponsive to unintended relative vertical movements between the vehicle body and truck.

13. In a mechanism for actuating the empty and load change-over apparatus of an empty and load brake system, in combination, a vehicle body and a truck therefor, a member operative to actuate the empty and load change-over apparatus, a mechanism for actuating said member, means operative to control the operation of said mechanism, and means comprising a normally stressed spring operatively secured to said body, truck and the control means responsive to vertical movements of the vehicle body relative to the truck caused by variations in the load carried by the body for actuating the control means, and unresponsive to relative vertical movements between the vehicle body and truck caused otherwise than by variations in the load carried by the body for actuating the control means.

14. In a mechanism for actuating the empty and load change-over apparatus of an empty and load brake system, in combination, a vehicle body and a truck therefor, a member operative to actuate the empty and load change-over apparatus, a mechanism for actuating said member, means operative to control the operation of said mechanism, and resilient means operatively secured to said means, vehicle body and truck and being responsive to certain intended vertical movements of the vehicle body relative to the truck for actuating the controlling means and unresponsive to unintended relative vertical movements between the vehicle body and truck.

15. In a mechanism for actuating the empty and load change-over apparatus of an empty and load brake system, in combination, a vehicle body and a truck therefor, a member operative to actuate the empty and load change-over apparatus, a mechanism for actuating said member, means operative to control the operation of said mechanism, and spring means carried by the vehicle body and operatively connected to the truck and controlling means and being responsive to certain intended vertical movements of the vehicle body relative to the truck for actuating the controlling means and unresponsive to unintended relative vertical movements between the vehicle body and truck.

16. In a mechanism for actuating the empty and load change-over apparatus of an empty and load brake system, in combination, a vehicle body and a truck therefor, a member operative to actuate the empty and load change-over apparatus, a mechanism for actuating said member, means operative to control the operation of said mechanism, means comprising a flexed resilient lever responsive to certain intended vertical movements of the vehicle body relative to the truck for actuating the controlling means and unresponsive to unintended relative vertical movements between the vehicle body and truck, and means operative to flex said lever for control of the control means.

17. In a mechanism for actuating the empty and load change-over apparatus of an empty and load brake system, in combination, a vehicle body and a truck therefor, a member operative to actuate the empty and load change-over apparatus, a mechanism for actuating said member, means operative to control the operation of said mechanism, means comprising a flexed resilient lever responsive to certain intended vertical movements of the vehicle body relative to the truck for actuating the controlling means and unresponsive to unintended relative vertical movements between the vehicle body and truck, and means operative to flex said lever to thereby condition the second mentioned means for control of the control means and to condition the control means for operation.

18. In a mechanism for actuating the empty and load change-over apparatus of an empty and load brake system, in combination, a vehicle body and a truck therefor, a member operative to actuate the empty and load change-over apparatus, a mechanism for actuating said member, means operative to control the operation of said mechanism, and a resilient lever fulcrumed at one end to a relatively fixed part of the truck and at the other end operatively connected with the control means and operative upon vertical movement of the body relative to the truck due to variations in the load carried by the body for actuating the control means, said lever being flexed to render it ineffective to actuate the control means when relative vertical movement between the body and truck occurs due to ordinary service shocks.

19. In a mechanism for actuating the empty and load change-over apparatus of an empty and load brake system, in combination, a vehicle body and a truck therefor, a member operative to actuate the empty and load change-over apparatus, a mechanism for actuating said member, means operative to control the operation of said mechanism, and a resilient lever fulcrumed at one end to a relatively fixed part of the truck and at the other end operatively connected with the control means and operative upon vertical movement of the body relative to the truck due to variations in the load carried by the body for actuating the control means, said lever being flexed in one direction when the vehicle body is empty and in the opposite direction when the vehicle body is loaded to render it ineffective under either condition to actuate the control means when relative vertical movement between the vehicle body and truck occurs due to conditions other than the variations in the load carried by the body.

20. In a mechanism for actuating the empty and load change-over apparatus of an empty and load brake system, in combination, a vehicle body and a truck therefor, a member operative to actuate the empty and load change-over apparatus, actuating means comprising a flexed resilient member responsive to vertical movement of the vehicle body relative to the truck when such movement is due to variations in the load carried by the vehicle body to actuate said member and unresponsive to relative vertical movement between the vehicle body and truck when such movement is due to conditions other than variations in the load carried, means for anchoring said actuating means to a fixed part of the truck in a certain adjusted position, and means operative to flex said resilient member for conditioning said actuating means for operation after the actuating means has been anchored to said fixed part of the truck.

21. In a mechanism for actuating the empty and load change-over apparatus of an empty and load brake system, in combination, a vehicle body and a truck therefor, a member operative to actuate the empty and load change-over apparatus, actuating means comprising a flexed resilient member responsive to vertical movement of the vehicle body relative to the truck when such movement is due to variations in the load carried by the vehicle body to actuate said member and unresponsive to relative vertical movement between the vehicle body and truck when such movement is due to conditions other than variations in the load carried, means for anchoring said actuating means to a fixed part of the truck in a certain adjusted position, and means operative to flex said resilient member a limited amount to thereby condition the actuating mechanism for operation according to relative vertical movement between the vehicle body and truck.

22. In a mechanism for actuating the empty and load change-over apparatus of an empty and load brake system, in combination, a vehicle body and a truck therefor, a member operative to actuate the empty and load change-over apparatus, actuating means comprising a resilient member flexed a limited amount and being responsive to vertical movement of the vehicle body relative to the truck when such movement is due to variations in the load carried by the vehicle body to actuate said member and unresponsive to relative vertical movement between the vehicle body and truck when such movement is due to conditions other than variations in the load carried, means for anchoring said actuating means to a fixed part of the truck in a certain adjusted position, and manually operative means for flexing said resilient member said limited amount for thereby conditioning the actuating mechanism for operation according to relative vertical movement between the vehicle body and truck.

23. In a mechanism for actuating the empty and load change-over apparatus of an empty and load brake system, in combination, a vehicle body and a truck therefor, a member operative to actuate the empty and load change-over apparatus, actuating means responsive to vertical movement of the vehicle body relative to the truck when such movement is due to variations in the load carried by the vehicle body to actuate said member and unresponsive to relative vertical movement between the vehicle body and truck when such movement is due to conditions other than variations in the load carried, said actuating mechanism comprising a resilient operating member pivotally carried intermediate its ends by said body and having one end anchored against vertical movement to a fixed part of the truck, and means for flexing said member when it is anchored to the truck to condition the mechanism for operation according to relative vertical movement between the vehicle body and truck.

24. In a mechanism for actuating the empty and load change-over apparatus of an empty and load brake system, in combination, a vehicle body and a truck therefor, a member operative to actuate the empty and load change-over apparatus, actuating means responsive to vertical movement of the vehicle body relative to the truck when such movement is due to variations in the load carried by the vehicle body to actuate said member and unresponsive to relative vertical movement between the vehicle body and truck when such movement is due to conditions other than variations in the load carried, said actuating mechanism comprising a resilient operating member pivotally carried intermediate its ends by said body and having one end anchored against vertical movement to a fixed part of the truck, and means cooperating with the other end of the resilient member and operative to flex the resilient member to condition the mechanism for operation according to relative movement between the vehicle body and truck.

25. In a mechanism for actuating the empty and load change-over apparatus of an empty and load brake system, in combination, a vehicle body and a truck therefor, a member operative to actuate the empty and load change-over apparatus, a fluid pressure controlled engine for actuating said member, a valve operative to control the supply of fluid under pressure to and the release of fluid under pressure from said engine to effect the operation of the engine, a shaft operative to actuate said valve, an arm for actuating said shaft, and a resilient lever interposed between said body and truck operatively connected at one end to the truck and operatively connected intermediate its ends to the body and operative according to relative vertical movement between the body and truck for actuating said arm and thereby said shaft and valve.

26. In a mechanism for actuating the empty and load change-over apparatus of an empty and load brake system, in combination, a vehicle body and a truck therefor, a member operative to actuate the empty and load change-over apparatus, a fluid pressure controlled engine for actuating said member, a valve operative to control the supply of fluid under pressure to and the release of fluid under pressure from said engine to effect the operation of the engine, a shaft operative to actuate said valve, an arm for actuating said shaft, and a resilient lever interposed between and connected to said body and truck and operative according to relative vertical movement between the body and truck for actuating said arm and thereby said shaft and valve, said lever being flexed vertically about its connection to said body to render it ineffective to actuate said arm under certain relative vertical movements between the body and truck.

27. In a mechanism for actuating the empty and load change-over apparatus of an empty and load brake system, in combination, a vehicle body and a truck therefor, a member operative to actuate the empty and load change-over apparatus, a fluid pressure controlled engine for actuating said member, a valve operative to control the supply of fluid under pressure to and the release of fluid under pressure from said engine to effect the operation of the engine, a shaft operative to actuate said valve, an arm for actuating said shaft, and a flexed resilient lever interposed between said body and truck operative according to relative vertical movement between the body and truck for actuating said arm and thereby said shaft and valve, said lever being flexed to render it ineffective to actuate said arm when, due to service shocks, vertical movement between the body and truck occurs.

28. In a mechanism for actuating the empty and load change-over apparatus of an empty and load brake system, in combination, a vehicle body and a truck therefor, a member operative to actuate the empty and load change-over apparatus, a fluid pressure controlled engine for actuating said member, a valve operative to control the supply of fluid under pressure to and the release of fluid under pressure from said engine to effect the operation of the engine, a shaft operative to actuate said valve, an arm for actuating said shaft, a resilient lever interposed between said body and truck and operative according to relative vertical movement between the body and truck for actuating said arm and thereby said shaft and valve, and means operative to actuate said arm to flex said lever in adjusting the mechanism to either an empty or loaded vehicle.

29. In a mechanism for actuating the empty and load change-over apparatus of an empty and load brake system, in combination, a vehicle body and a truck therefor, said body being capable of vertical movement relative to the truck, means operative to actuate the empty and load change-over apparatus, and a spring secured intermediate its ends to said body and cooperating at its ends with said truck and means for controlling the operation of said means.

30. In a mechanism for actuating the empty and load change-over apparatus of an empty and load brake system, in combination, a vehicle body and a truck therefor, means operative to actuate the empty and load change-over apparatus, and a leaf spring operatively connected intermediate its ends to said body and cooperating at its ends with said truck and means for controlling the operation of said means.

31. In a mechanism for actuating the empty and load change-over apparatus of an empty and load brake system, in combination, a vehicle body and a truck therefor, means operative to actuate the empty and load change-over apparatus, and a leaf spring pivotally carried intermediate its ends by the vehicle body and cooperating at its ends with said truck and said means for controlling the operation of said means.

32. In a mechanism for actuating the empty and load change-over apparatus of an empty and load brake system, in combination, a vehicle body and a truck therefor, means operative to actuate the empty and load change-over apparatus, and a leaf spring for controlling the operation of said means, said spring intermediate its ends cooperating with said body and at one end with said truck and operative according to relative vertical movement between the body and truck to control the operation of said means.

33. In a mechanism for actuating the empty and load change-over apparatus of an empty and load brake system, in combination, a vehicle body and a truck therefor, means operative to actuate the empty and load change-over apparatus, and a spring connected intermediate its ends to said body and at one end to said truck operative according to relative vertical movement between the body and truck for controlling the operation of said means.

34. In a mechanism for actuating the empty and load change-over apparatus of an empty and load brake system, in combination, a vehicle body and a truck therefor, means operative to actuate the empty and load change-over apparatus, and a leaf spring operatively connected intermediate its ends to said body, at one end to said means and at the other end to said truck operative according to relative movement between the body and truck for controlling the operation of said means.

35. In a mechanism for actuating the empty and load change-over apparatus of an empty and load brake system, in combination, a vehicle body and a truck therefor, means operative to actuate the empty and load change-over apparatus, and a leaf spring pivotally carried intermediate its ends by the vehicle body and at one end operatively anchored to a fixed part of the truck and at its other end operatively connected to said means, said spring being adapted to control the operation of said means according to relative movement between the body and truck.

36. In a mechanism for controlling the operation of an empty and load change-over apparatus of an empty and load brake system, in combination, a vehicle body and a truck therefor, means operative to effect the operation of said change-over apparatus, said means comprising resilient means operative upon gradual movement of said body vertically relative to said truck as when the body is being loaded or unloaded for effecting the operation of said change-over apparatus, and means operative upon sudden vertical undulations between said body and truck for rendering said resilient means ineffective to effect the operation of said change-over apparatus when said undulations are of such magnitude that said resilient means has a tendency to actuate said change-over apparatus.

37. In a mechanism for controlling the operation of an empty and load change-over apparatus of an empty and load brake system, in combination, a vehicle body and a truck therefor, means operative to effect the operation of said change-over apparatus, said means comprising resilient means operative upon gradual movement of said body vertically relative to said truck as when the body is being loaded or unloaded for effecting the operation of said change-over apparatus, and dash-pot means operative upon sudden vertical undulations between said body and truck for rendering said resilient means ineffective to effect the operation of said change-over apparatus when said undulations are of such magnitude that said resilient means has a tendency to actuate said change-over apparatus.

38. In a mechanism for controlling the operation of an empty and load change-over apparatus of an empty and load brake system, in combination, a vehicle body and a truck therefor, means operative to effect the operation of said change-over apparatus, said means comprising resilient means operative upon gradual movement of said body vertically relative to said truck as when the body is being loaded or unloaded for effecting the operation of said change-over apparatus, and a mechanism operatively connecting said resilient means and change-over apparatus and operative upon sudden vertical undulations of the body relative to the truck for rendering said resilient means ineffective to effect the operation of said change-over apparatus when said undulations are of such magnitude that said resilient means has a tendency to actuate said change-over apparatus.

39. In a mechanism for controlling the operation of an empty and load change-over apparatus of an empty and load brake equipment, in combination, a vehicle body and a truck therefor, and means automatically operative to effect the operation of said change-over apparatus, said means comprising a resilient member connected intermediate its ends to said vehicle body and cooperating at its ends with said truck for controlling the operation of said apparatus according to relative vertical movement between said body and truck.

40. In a mechanism for controlling the operation of an empty and load change-over apparatus of an empty and load brake equipment, in combination, a vehicle body and a truck therefor, and means automatically operative to effect the operation of said change-over apparatus, said means comprising a resilient lever pivotally connected intermediate its ends to said vehicle body and anchored at one end to said truck, the opposite end of said lever being operative according to relative movement between said body and truck to effect the operation of said change-over apparatus.

CLYDE C. FARMER.

CERTIFICATE OF CORRECTION.

Patent No. 2,092,245.

September 7, 1937.

CLYDE C. FARMER.

It is hereby certified that error appears in the printed specification of the above numbered patent requiring correction as follows: Page 7, first column, line 6, claim 8, for the word "vertical" read vehicle; and that the said Letters Patent should be read with this correction therein that the same may conform to the record of the case in the Patent Office.

Signed and sealed this 16th day of November, A. D. 1937.

(Seal)

Henry Van Arsdale,
Acting Commissioner of Patents.